United States Patent
Kim et al.

(10) Patent No.: US 7,633,572 B2
(45) Date of Patent: Dec. 15, 2009

(54) LIQUID CRYSTAL DISPLAY AND METHOD OF DRIVING THE SAME

(75) Inventors: Do Young Kim, Ulsan (KR); Hae Jin Heo, Ulsan (KR); Ji Ryun Park, Ulsan (KR); Ghang Kim, Ulsan (KR); Won Mi Hwang, Ulsan (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 410 days.

(21) Appl. No.: 11/521,321

(22) Filed: Sep. 13, 2006

(65) Prior Publication Data

US 2007/0115400 A1      May 24, 2007

(30) Foreign Application Priority Data

Nov. 23, 2005     (KR) .................. 10-2005-0112594

(51) Int. Cl.
*G02F 1/133*      (2006.01)
*G02F 1/136*      (2006.01)
*G02F 1/1335*     (2006.01)

(52) U.S. Cl. ............................. 349/43; 349/33; 349/61; 349/114

(58) Field of Classification Search .................. 349/33, 349/43, 61, 114
See application file for complete search history.

(56) References Cited

U.S. PATENT DOCUMENTS

2003/0218664 A1* 11/2003 Sakamoto et al. ........... 347/114
2007/0081114 A1*  4/2007 Fiolka et al. .................. 349/96
2008/0106655 A1*  5/2008 Asao .............................. 349/33

FOREIGN PATENT DOCUMENTS

| JP | 2000-356768 | 12/2000 |
| JP | 2001-235743 | 8/2001 |
| JP | 2003-140143 | 5/2003 |

(Continued)

OTHER PUBLICATIONS

Patent Abstracts of Japan for publication No. 2000-356768 dated Dec. 26, 2000 in the name of Kenji Nakao, et al.

(Continued)

*Primary Examiner*—Frank G Font
*Assistant Examiner*—Jerry Blevins
(74) *Attorney, Agent, or Firm*—Christie, Parker & Hale, LLP

(57) ABSTRACT

A liquid crystal display (LCD) includes a first substrate having an array of wiring lines and pixel regions. The pixel regions have pixel electrodes, thin film transistors with drain electrodes, and storage capacitors. The LCD also includes a second substrate having color filters, black matrices, opened regions to receive external light positioned in regions in which the black matrices are not positioned, and transparent common electrodes. Liquid crystal is between the first and second substrates. The opened regions correspond to first regions in which the drain electrodes and the pixel electrodes are connected and second regions in which the storage capacitors are positioned. In one embodiment, the liquid is driven in a normally white mode when the LCD is driven in a transmissive mode, and is driven in a normally black mode when the LCD is driven in a reflective mode.

16 Claims, 3 Drawing Sheets

FOREIGN PATENT DOCUMENTS

| | | |
|---|---|---|
| JP | 2003-303863 | 10/2003 |
| JP | 2005-087012 | 4/2005 |
| JP | 2005-115282 | 4/2005 |
| KR | 2002-0010747 | 2/2002 |
| KR | 10-2004-0084210 | 10/2004 |
| WO | WO 03/085450 | 10/2003 |

OTHER PUBLICATIONS

Patent Abstracts of Japan for publication No. 2001-235743 dated Aug. 31, 2001 in the name of Osamu Okumura, et al.
Patent Abstracts of Japan for publication No. 2003-140143 dated May 14, 2003 in the name of Osamu Okumura, et al.
Patent Abstracts of Japan for publication No. 2003-303863 dated Oct. 24, 2003 in the name of Satoshi Chinda, et al.
Patent Abstracts of Japan for publication No. 2005-115282 dated Apr. 28, 2005 in the name of Chigusa Tsurukawa, et al.
Korean Patent Abstract for Korean Publication No. 1020020010747 A, published Feb. 6, 2002 in the name of Heum Il Baek.
Korean Patent Abstracts, Publicaton No. 1020040084210 A, dated Oct. 6, 2004, in the name of Hun Kang et al.
Japanese Office action dated Aug. 25, 2009, for corresponding Japan application 2006-111219, noting listed references in this IDS.

* cited by examiner

LIQUID CRYSTAL DISPLAY AND METHOD OF DRIVING THE SAME

CROSS-REFERENCE TO RELATED APPLICATIONS

This application claims priority to and the benefit of Korean Patent Application No. 10-2005-112594, filed on Nov. 23, 2005, in the Korean Intellectual Property Office, the entire content of which is incorporated herein by reference.

BACKGROUND

1. Field of the Invention

The present invention relates to a liquid crystal display, and more particularly to a liquid crystal display capable of realizing a reflection mode through a transmissive liquid crystal display and a method of driving the same.

2. Discussion of Related Art

In a conventional liquid crystal display (LCD), two substrates are arranged so that respective surfaces, on which electric field generating electrodes are positioned to face each other. Liquid crystal is inserted between the two substrates, and a voltage is applied to the two electrodes to generate an electric field by which liquid crystal molecules are moved so that an image is displayed by the transmittance of light that varies with the movement of the liquid crystal molecules.

An active matrix liquid crystal display (AM-LCD) includes pixels that have thin film transistors (TFTs) that are switching devices that open and close the pixels. The AM-LCD type of liquid crystal display is the most spotlighted type, since the AM-LCD has high resolution and moving picture realizing ability.

Hereinafter, the lamination structure of a common LCD will be described with reference to FIG. 1.

FIG. 1 is a schematic perspective view of a common LCD. First and second substrates 10 and 30 are arranged to face each other, a plurality of gate wiring lines 12 and data wiring lines 14 that cross each other are on the internal surface of the first substrate 10, TFTs T are in the crossed regions between the gate wiring lines 12 and the data wiring lines 14, and pixel electrodes 16 connected to the TFTs T are in pixel regions P defined by the crossed regions between the gate wiring lines 12 and the data wiring lines 14.

Storage capacitors Cst (not shown) for storing data signals applied through the data wiring lines 14 for one frame period are included in respective pixel regions. The storage capacitors are composed of first electrodes (not shown) arranged to run parallel to the gate wiring lines 12 and second electrodes (not shown) on the first electrodes with an insulating layer interposed between them.

Color filter layer 32 and common electrodes 34 are sequentially positioned on the internal surface of the second substrate 30 and a liquid crystal layer 50 is interposed between the pixel electrodes 16 and the common electrodes 34.

Black matrices (BMs) are between the color filter layers 32 in the regions of the TFTs T and the storage capacitors Cst on the first substrate to prevent light from leaking.

First and second polarizers 52 and 54 are arranged on the rear surfaces of the first and second substrates 10 and 30 and a backlight that is a light source device for supplying light is arranged on the rear surface of the first polarizer 52.

According to the conventional LCD, light generated by the backlight passes through the respective cells, that is, the pixel regions of the LCD so that only 7% of the light is actually transmitted on a screen. Therefore, the backlight is made brighter in order to provide an LCD with high brightness. Increasing the brightness of the backlight, however, increases power consumption.

Therefore, a heavy battery is used as a power source of the backlight. However, the battery has limitations on use time.

In order to solve the problem, a semi-transmissive LCD that has both a transmissive mode in which light of the backlight is used and a reflection mode in which external light is used has been studied and developed.

The reflective-transmissive LCD has both the function of a transmissive LCD and the function of a reflective LCD so that the reflective-transmissive LCD can use light of the backlight and an external natural or artificial light source. Therefore, it is possible to reduce power consumption without being restricted by peripheral circumstances.

However, according to the conventional reflective-transmissive LCD, reflecting electrodes that form reflecting units in partial regions of the pixel regions on the first substrate are added and a retardation film (quarter wave plate ($\lambda/4$)) is added between a polarizer and a panel.

SUMMARY OF THE INVENTION

Accordingly, in one embodiment of the present invention, a transmissive liquid crystal display (LCD) includes black matrices that are not positioned in the regions on a second substrate corresponding to a first region in which a drain electrode and a pixel electrode are connected to each other and a second region in which a storage capacitor is positioned in a pixel region of a first substrate. These regions form reflecting units and the maximum value of a data gray scale voltage when the LCD is driven in a reflective mode is controlled to be ½ of maximum value of the data gray scale voltage when the LCD is driven in a transmissive mode so that the reflective mode is realized by the transmissive LCD and a method of driving the same.

One embodiment of a liquid crystal display includes a first substrate having an array of wiring lines and pixel regions, the pixel regions having pixel electrodes, thin film transistors having drain electrodes, and storage capacitors positioned therein; a second substrate having color filters in regions corresponding to the pixel regions, black matrices between the color filters, opened regions to receive external light positioned in regions in which the black matrices are not positioned, and transparent common electrodes on the color filters and the black matrices; and a liquid crystal layer between the first substrate and the second substrate. The opened regions correspond to first regions in which respective ones of the drain electrodes and the pixel electrodes are connected to each other and second regions in which the storage capacitors are positioned in the pixel regions of the first substrate.

In another embodiment, a first orientation layer and a second orientation layer are on internal surfaces of the first substrate and the second substrate, respectively. The first orientation layer and the second orientation layer may be oriented to be anti-parallel so that the liquid crystal layer between the orientation layers is in an electrically controlled birefringence (ECB) mode. The phase difference value of the liquid crystal layer may be set as $\lambda/2$.

One embodiment also includes a first polarizer and a second polarizer arranged on external surfaces of the first substrate and the second substrate, respectively, so that transmission axes of the first polarizer and the second polarizer intersect each other. A polarization film for generating $\lambda/2$ polarization may be used as each of the first polarizer and the second polarizer. A backlight that is a light source device adapted to supply light during operation of the liquid crystal display in a transmissive mode may also be provided under the first substrate.

The array of wiring lines may include gate wiring lines and data wiring lines crossing the gate wiring lines at the pixel regions; the thin film transistors may also include gate electrodes, source electrodes, and active layers; the source electrodes may be connected to respective ones of the data wiring lines; and the gate electrodes may be connected to respective ones of the gate wiring lines.

The storage capacitors may include first electrodes aligned in parallel to the gate wiring lines; and an insulating layer and second electrodes integrated with the drain electrodes and sequentially positioned on respective ones of the first electrodes.

A method of driving a liquid crystal display having liquid crystal according to one embodiment includes selectively driving the liquid crystal display in a transmissive mode and in a reflective mode. The liquid crystal is driven in a normally white mode when the liquid crystal display is driven in the transmissive mode, and the liquid crystal is driven in a normally black mode when the liquid crystal display is driven in the reflective mode.

The method may also include providing the liquid crystal display including providing a first substrate having an array of wiring lines and pixel regions, the pixel regions having pixel electrodes, thin film transistors having drain electrodes, and storage capacitors positioned therein; providing a second substrate having color filters in regions corresponding to the pixel regions, black matrices between the color filters, opened regions to receive external light positioned in regions in which the black matrices are not positioned during the operation of the liquid crystal display in a reflective mode, and transparent common electrodes on the color filters and the black matrices; and providing the liquid crystal between the first substrate and the second substrate. The opened regions correspond to first regions in which respective ones of the drain electrodes and the pixel electrodes are connected to each other and second regions in which the storage capacitors are positioned in the pixel regions of the first substrate.

Another embodiment also includes providing a first polarizer and a second polarizer arranged on external surfaces of the first substrate and the second substrate, respectively, so that transmission axes of the first polarizer and the second polarizer intersect each other. A polarization film for generating $\lambda/2$ polarization may be used as each of the first polarizer and the second polarizer. The method may also include setting a phase difference value of the liquid crystal as $\lambda/2$.

A signal voltage may be applied that makes the phase difference value of the liquid crystal $\lambda/4$ during operation of the liquid crystal display in the reflective mode as a maximum signal voltage.

Another embodiment of an LCD according to the invention includes a first substrate having an array of wiring lines and pixel regions, the pixel regions having pixel electrodes, thin film transistors having drain electrodes, and storage capacitors positioned therein; a second substrate having color filters positioned in regions corresponding to the pixel regions, black matrices positioned between the color filters, opened regions to receive external light positioned in regions in which the black matrices are not positioned, and transparent common electrodes positioned on the color filters and the black matrices; and a liquid crystal layer positioned between the first substrate and the second substrate. The opened regions correspond to first regions in which respective ones of the drain electrodes and the pixel electrodes are connected to each other and second regions in which the storage capacitors are positioned in the pixel regions of the first substrate.

BRIEF DESCRIPTION OF THE DRAWINGS

These and/or other features and aspects of the invention will become apparent and more readily appreciated from the following description of examples of embodiments, taken in conjunction with the accompanying drawings of which.

DETAILED DESCRIPTION

Hereinafter, examples of embodiments according to the present invention will be described with reference to the accompanying drawings.

Figure 1:
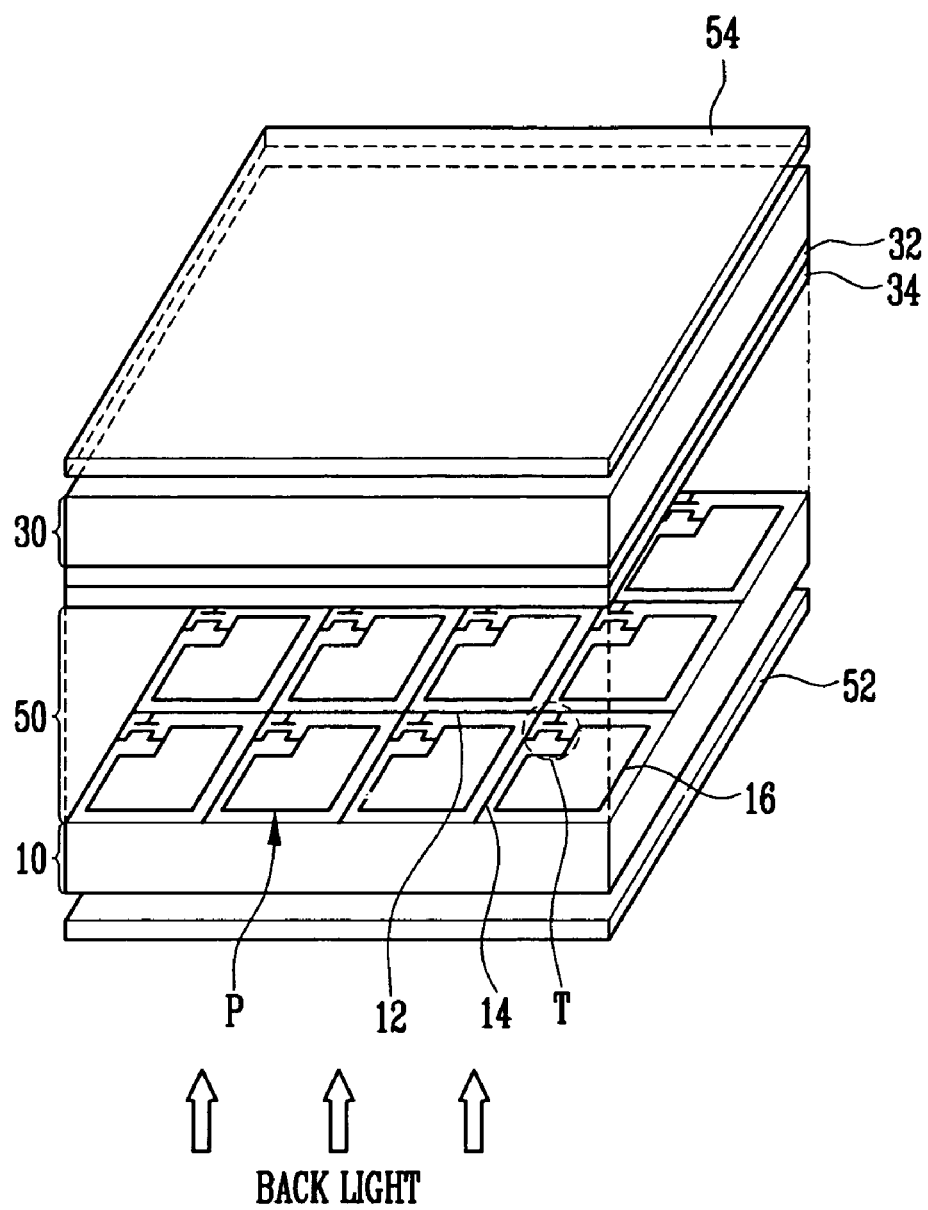
FIG. 1 is a schematic perspective view of a conventional liquid crystal display (LCD)
Figure 2:
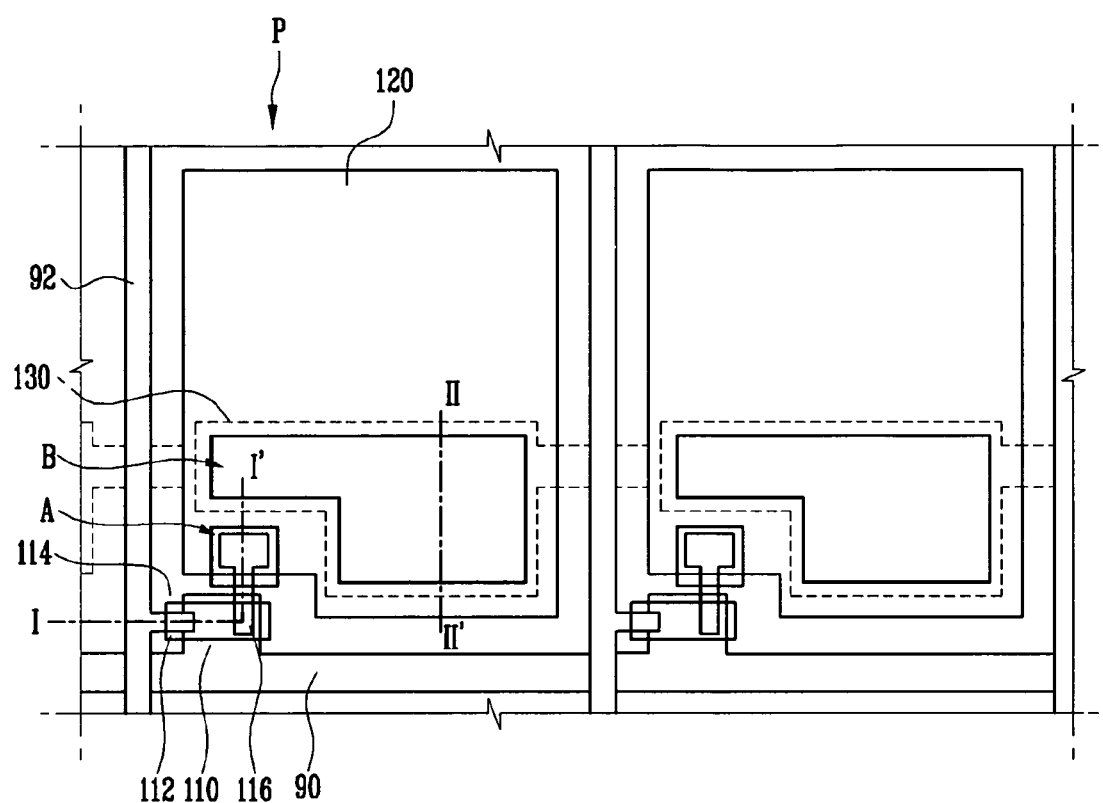
FIG. 2 is a plan view of an LCD according to an embodiment of the present invention.
Figure 3:
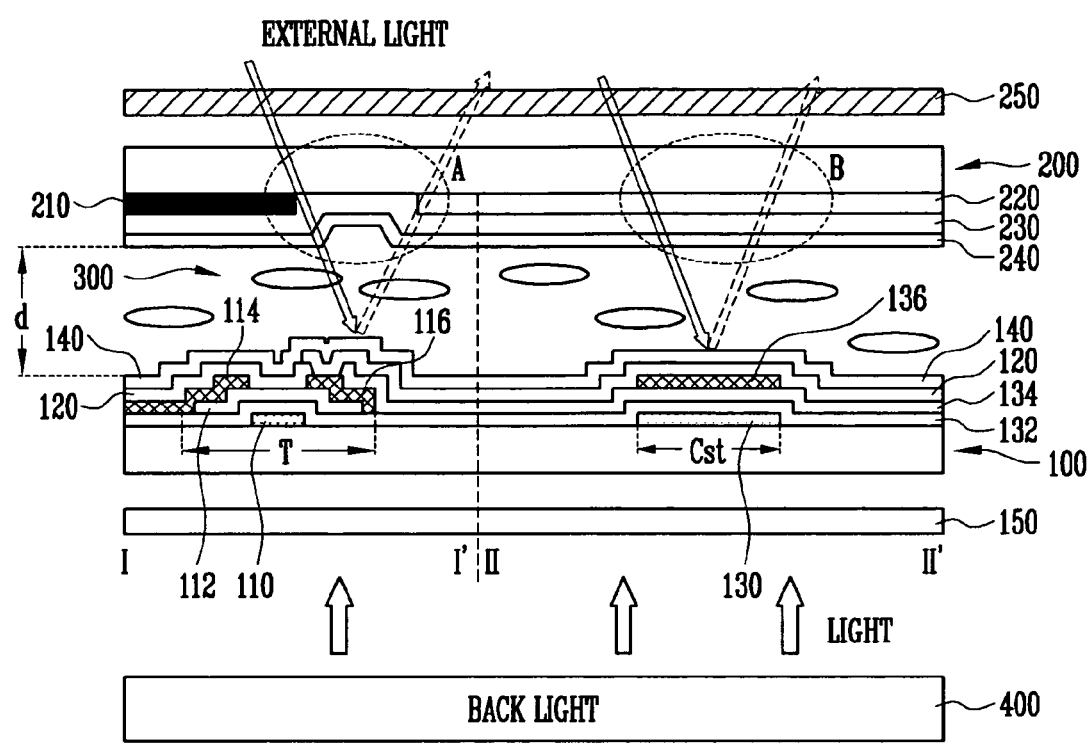
FIG. 3 is a sectional view taken along the lines I-I' and II-II' of FIG. 2.

FIG. 2 is a plan view of an LCD according to an embodiment of the present invention and FIG. 3 is a sectional view taken along the lines I-I' and II-II' of FIG. 2.

As illustrated in FIGS. 2 and 3, the LCD according to this embodiment of the present invention includes a first substrate 100 on which pixel regions P and array wiring lines are positioned. The pixel regions P include pixel electrodes 120, TFTs T, and storage capacitors Cst. This embodiment also includes a second substrate 200, on which color filters 220 are positioned in the regions corresponding to the pixel regions, black matrices 210 are between the color filters 220 and in predetermined regions of the TFTs T, and transparent common electrodes 230 are on the color filters 220 and the black matrices 210. Liquid crystal 300 is positioned between the first substrate 100 and the second substrate 200.

A first orientation layer 140 and a second orientation layer 240 are on the internal surfaces of the first substrate 100 and the second substrate 200, respectively. The initial orientation direction of the liquid crystal 300 is determined by the orientation layers 140 and 240.

Each of the TFTs T in a matrix that is a switching device is positioned on one side of a respective one of the pixel regions P. The pixel regions P are defined by the gate wiring lines 90 and the data wiring lines 92 that cross each other. The pixel electrodes 120 on the pixel regions P are made of transparent and conductive metal having high transmittance of light such as indium tin oxide (ITO).

In the LCD, the liquid crystal layer 300 positioned on the pixel electrodes 120 is oriented by the signals applied from the TFTs T, and the amount of light that passes through the liquid crystal layer 300 is controlled by the degree of orientation of the liquid crystal layer 300 so that it is possible to display an image.

The gate wiring lines 90 transmit a pulse voltage that drives gate electrodes 110 that are first electrodes of the TFTs T and the data wiring lines 92 transmit a signal voltage that drives source electrodes 114 that are second electrodes of the TFTs T.

The TFTs T include the gate electrodes 110, the source electrodes 114, drain electrodes 116, and active layers 112. The source electrodes 114 are connected to the data wiring lines 92 and the gate electrodes 110 are connected to the gate wiring lines 90 that cross the data wiring lines 92 to define the pixel regions P.

That is, when a predetermined pulse voltage is applied to the gate electrodes 110, the active layers 112 are activated so that the drain electrodes 116 receive the signal voltage from the data wiring lines 92 connected to the source electrodes 114 through the source electrodes 114. The source electrodes 114 are separated from the drain electrodes 116 by a predetermined distance through the active layers 112 and are electrically connected to the pixel electrodes 120 through contact holes. As a result, the signal voltage is applied to the pixel electrodes 120.

As illustrated in FIGS. 2 and 3, first electrodes 130 of the storage capacitors are formed to run parallel to the gate wiring lines 90 and an insulating layer and second electrodes 136 integrated with the drain electrodes are sequentially formed on the first electrodes 130 to form the storage capacitors Cst. The insulating layer may be used as a gate insulating layer 132 and/or a protective layer 134.

According to this embodiment of the present invention, the black matrices 210 on the second substrate 200 are not positioned in regions A and B corresponding to a first region A in which the drain electrode 116 and the pixel electrode 120 are connected to each other and a second region B in which the storage capacitor is positioned in the pixel region P of the first substrate 100 so that external light is received to the inside of the LCD. Therefore, it is possible to realize a reflective mode LCD by the opened regions A and B Since the drain electrode 116 and the second electrode 136 of the storage capacitor operate as reflecting electrodes in the first and second regions, respectively, it is not necessary to form additional reflecting electrodes, as in the conventional reflective LCD.

The maximum value of the data gray scale voltage applied to data lines when the reflective mode is realized is controlled to be ½ of the maximum value of the data gray scale voltage applied to data lines when a transmissive mode is realized, which will be described in detail in the operation of the LCD.

First and second polarizers 150 and 250 are arranged on the external surfaces of the first and second substrates 100 and 200, respectively, and a backlight that is a light source device that supplies light when the LCD operates in the transmissive mode is arranged on the rear surface of the first polarizer 150.

Here, the first and second polarizers 150 and 250 are arranged so that the transmission axes thereof intersect each other and a polarization film that generates $\lambda/2$ polarization is used as each of the polarizers.

The phase difference $\Delta$nd of the liquid crystal 300 between the substrates is set as $\lambda/2$. Therefore, a cell gap d between the substrates is controlled or liquid crystal that satisfies the above condition is used. For example, electrically controlled birefringence (ECB) mode liquid crystal may be used. In this case, the first and second orientation layers are oriented to be anti-parallel.

Here, $\Delta$n, d, and $\lambda$ represent refractive anisotropy, a cell gap that is the distance by which light passes through the liquid crystal layer, and the wavelength of light, respectively.

Hereinafter, the operation of the LCD according to this embodiment of the present invention will be described in detail with reference to FIGS. 2 and 3. First, the case where the LCD operates in the transmissive mode will be described. Since the structure of the LCD according to this embodiment of the present invention is the same as the structure of the conventional LCD excluding that the black matrices 210 are not positioned in the predetermined regions A and B, that is, the first region A in which the drain electrode 116 and the pixel electrode 120 are connected to each other and the second region B in which the storage capacitor Cst is positioned in the pixel region of the first substrate, the LCD according to this embodiment of the present invention operates in the same way as the conventional transmissive LCD.

That is, in the case where it is assumed that the transmissive LCD operates in a normally white mode, when a signal voltage of 0V is applied, the light applied from the backlight 400 directly passes through the first polarizer 150, the liquid crystal layer 300, and the second polarizer 250 so that white is displayed. When the maximum signal voltage of 5V is applied, the light applied from the backlight 400 is not transmitted due to the phase difference generated by the distortion of the liquid crystal 300 so that black is displayed.

That is, when the signal voltages between 0 to 5V are applied, the LCD displays various gray scales from white to black to display a desired image.

On the other hand, when the LCD operates in the reflective mode, the backlight is not driven but the LCD is driven using external light incident through the opened regions A and B in which the black matrices 210 are not positioned.

In this case, the LCD operates in a normally black mode, in contrast to the case where the LCD operates in the transmissive mode. Therefore, when the signal voltage of 0V is applied so that external light passes through the second polarizer 250 and the liquid crystal layer 300 and is reflected by the drain electrode 116 in the first region A and the storage capacitor second electrode 136 in the second region B as reflecting electrodes, polarization different from the transmission axis of the second polarizer 250 is provided so that light does not pass through the second polarizer 250 and that the LCD displays black as a result.

On the other hand, when a signal voltage of 2.5V that is ½ of the maximum value of the signal voltage is applied, the phase difference $\Delta$nd of the liquid crystal 300 is $\lambda/4$ so that light that is linearly polarized by the second polarizer 250 is converted into circular polarization and linear polarization by the liquid crystal 300 and the reflecting electrodes 116 and 136. Therefore, the same polarization as the transmission axis of the second polarizer 250 is provided so that light passes through the second polarizer 250 and that the LCD displays white as a result.

To be specific, when the voltage is in an on state, that is, when the signal voltage of 2.5V that is ½ of the maximum value of the signal voltage is applied, only linear polarization the same as the polarization axis of the second polarizer 250 passes through the second polarizer 250 among external scattered light components.

In the linear polarization that passes through the second polarizer 250, the polarization state of left-hand circular polarization is changed by the liquid crystal layer 300 whose phase difference is $\lambda/4$. The polarization direction of the left-hand circular polarization is reversed while the left-hand circular polarization is reflected by the reflecting electrodes 116 and 136 so that the left-hand circular polarization becomes right-hand circular polarization.

The right-hand circular polarization is converted into linear polarization, similar to the polarization axis of the second polarizer 250 by the liquid crystal layer 300 whose phase difference is $\lambda/4$. The light thus passes through the second polarizer 250 so that white is displayed.

That is, according to this embodiment of the present invention, the open regions A and B in which the black matrices 210 are not positioned that correspond to the first region A in which the drain electrode 116 and the pixel electrode 120 are connected to each other and the second region B in which the storage capacitor Cst is in the pixel region P of the first substrate 100 are provided and a signal voltage having the value that is ½ of the maximum value of the signal voltage is applied when the LCD operates in the reflective mode so that the phase difference of liquid crystal is $\lambda/4$. As a result, it is possible to simply realize the semi-transmissive LCD.

When it is assumed that liquid crystal is driven in the normally white mode in the LCD driven in the transmissive mode, liquid crystal is driven in the normally black mode in the LCD driven in the reflective mode.

Therefore, according to the present invention, when the reflective mode is realized, it is not necessary to provide the additional retardation plate and to make the cell gap in the transmissive mode different from the cell gap in the reflective mode.

According to the present invention, it is possible to realize the reflective mode without additionally including the reflecting electrodes and the retardation plate using the basic structure of the transmissive LCD so that it is possible to reduce fabrication cost. Also, it is possible to use both the light of the backlight and the external natural or artificial light source so that it is possible to reduce power consumption without being restricted by peripheral circumstances.

Although a few embodiments of the present invention have been shown and described, it would be appreciated by those skilled in the art that changes might be made in these embodiments without departing from the principles and spirit of the invention, the scope of which is defined in the claims and their equivalents.

What is claimed is:

1. A liquid crystal display comprising:
   a first substrate having an array of wiring lines and pixel regions, the pixel regions having pixel electrodes, thin film transistors having drain electrodes, and storage capacitors positioned therein;
   a second substrate having color filters in regions corresponding to the pixel regions, black matrices between the color filters, a first polarizer, open regions to receive an external light in a reflective mode and pass a backlight in a transmissive mode and positioned in regions in which the black matrices are not positioned, and transparent common electrodes on the color filters and the black matrices; and
   a liquid crystal layer between the first substrate and the second substrate,
   wherein the open regions correspond to first regions in which respective ones of the drain electrodes and the pixel electrodes are connected to each other and second regions in which the storage capacitors are positioned in the pixel regions of the first substrate, and
   wherein the backlight is passed thru both first and second regions when a minimum signal voltage is applied to the liquid crystal display and is blocked by the liquid crystal layer when a maximum signal voltage is applied, in the transmissive mode, and
   wherein the external light is passed thru both first and second regions and is reflected by the drain electrodes in the first regions and first electrodes of the storage capacitors in the second regions and blocked by the first polarizer when the minimum signal voltage is applied and the external light is passed thru both first and second regions and is reflected by the drain electrodes in the first regions and first electrodes of the storage capacitors in the second regions and is passed thru the first polarizer when a voltage approximately equal to one-half of the maximum voltage is applied, in the reflective mode.

2. The liquid crystal display as claimed in claim 1, wherein a first orientation layer and a second orientation layer are on internal surfaces of the first substrate and the second substrate, respectively.

3. The liquid crystal display as claimed in claim 2, wherein the first orientation layer and the second orientation layer are oriented not to be parallel so that the liquid crystal layer between the orientation layers is in an electrically controlled birefringence (ECB) mode.

4. The liquid crystal display as claimed in claim 1, wherein a phase difference value of the liquid crystal layer is set as $\lambda/2$.

5. The liquid crystal display as claimed in claim 1, further comprising a second polarizer arranged on external surface of the second substrate, so that transmission axes of the first polarizer and the second polarizer intersect each other.

6. The liquid crystal display as claimed in claim 5, wherein a polarization film for generating a $\lambda/2$ polarization is used as each of the first polarizer and the second polarizer.

7. The liquid crystal display as claimed in claim 1, further comprising a backlight source device adapted to supply the backlight during operation of the liquid crystal display in the transmissive mode under the first substrate.

8. The liquid crystal display as claimed in claim 1,
   wherein the gate wiring lines cross the data wiring lines at the pixel regions,
   wherein the thin film transistors further comprise gate electrodes, source electrodes, and active layers,
   wherein the source electrodes are connected to respective ones of the data wiring lines, and
   the gate electrodes are connected to respective ones of the gate wiring lines.

9. The liquid crystal display as claimed in claim 8, wherein the storage capacitors further comprise:
   first electrodes aligned in parallel to the gate wiring lines; and
   an insulating layer and second electrodes integrated with the drain electrodes and sequentially positioned on respective ones of the first electrodes.

10. A method of driving a liquid crystal display having liquid crystal comprising:
    selectively driving the liquid crystal display in a transmissive mode by applying a minimum signal voltage to pass thru a backlight and a maximum signal voltage to block the backlight by the liquid crystal layer; and
    selectively driving the liquid crystal display in a reflective mode by applying the minimum signal voltage to block a reflected external light and applying a voltage approximately equal to one-half of the maximum voltage pass thru the reflected external light,
    wherein the liquid crystal is driven in a normally white mode when the liquid crystal display is driven in the transmissive mode, and
    wherein the liquid crystal is driven in a normally black mode when the liquid crystal display is driven in the reflective mode.

11. The method as claimed in claim 10, further comprising providing the liquid crystal display comprising:
    a first substrate having an array of wiring lines and pixel regions, the pixel regions having pixel electrodes, thin film transistors having drain electrodes, and storage capacitors positioned therein; and
    a second substrate having color filters in regions corresponding to the pixel regions, black matrices between the color filters, open regions to receive external light positioned in regions in which the black matrices are not positioned during the operation of the liquid crystal display in a reflective mode, and transparent common electrodes on the color filters and the black matrices;
    wherein the open regions correspond to first regions in which respective ones of the drain electrodes and the pixel electrodes are connected to each other and second regions in which the storage capacitors are positioned in the pixel regions of the first substrate.

12. The method as claimed in claim 11, further comprising providing a first polarizer and a second polarizer arranged on external surfaces of the first substrate and the second substrate, respectively, so that transmission axes of the first polarizer and the second polarizer intersect each other.

13. The method as claimed in claim 12, wherein a polarization film for generating $\lambda/2$ polarization is used as each of the first polarizer and the second polarizer.

14. The method as claimed in claim 11, further comprising setting a phase difference value of the liquid crystal as $\lambda/2$.

15. The method as claimed in claim 14, further comprising applying a signal voltage that makes the phase difference value of the liquid crystal $\lambda/4$ during operation of the liquid crystal display in the reflective mode as a maximum signal voltage.

16. A liquid crystal display comprising:
  a first substrate having an array of wiring lines and pixel regions, the pixel regions having pixel electrodes, thin film transistors having drain electrodes, and storage capacitors positioned therein;
  a second substrate having black matrices, a first polarizer, open regions to receive an external light in a reflective mode and pass a backlight in a transmissive mode; and
  a liquid crystal layer between the first substrate and the second substrate,
  wherein the backlight is passed thru the open regions or blocked by the liquid crystal layer, in the transmissive mode, and
  wherein the external light is passed thru the open regions and is reflected by the drain electrodes and first electrodes of the storage capacitors and blocked by the first polarizer, or passed thru the open regions and reflected by the drain electrodes and first electrodes of the storage capacitors and is passed thru the first polarizer, in the reflective mode.

* * * * *